United States Patent
Nijhawan et al.

(10) Patent No.: US 10,599,849 B2
(45) Date of Patent: Mar. 24, 2020

(54) SECURITY MODULE AUTHENTICATION SYSTEM

(71) Applicant: Dell Products L.P., Round Rock, TX (US)

(72) Inventors: Vijay Bharat Nijhawan, Austin, TX (US); Ching-Lung Chao, Austin, TX (US); Jayanth Raghuram, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 15/970,549

(22) Filed: May 3, 2018

(65) Prior Publication Data

US 2019/0340365 A1    Nov. 7, 2019

(51) Int. Cl.
*G06F 21/57*      (2013.01)
*G06F 9/4401*     (2018.01)
*G06F 21/44*      (2013.01)

(52) U.S. Cl.
CPC .......... *G06F 21/575* (2013.01); *G06F 9/4401* (2013.01); *G06F 21/44* (2013.01); *G06F 21/572* (2013.01)

(58) Field of Classification Search
CPC ...... G06F 21/575; G06F 9/4401; G06F 21/44; G06F 21/572
USPC .......................................................... 713/2
See application file for complete search history.

(56) References Cited

U.S. PATENT DOCUMENTS

| | | | | |
|---|---|---|---|---|
| 7,584,508 | B1 * | 9/2009 | Kashchenko | G06F 21/577 726/25 |
| 7,607,174 | B1 * | 10/2009 | Kashchenko | G06F 21/74 726/23 |
| 7,797,550 | B2 * | 9/2010 | Carr | G06F 21/10 380/201 |
| 9,171,253 | B1 * | 10/2015 | Wright | G06N 5/02 |
| 10,467,422 | B1 * | 11/2019 | Roth | G06F 21/6218 |
| 2003/0145068 | A1 * | 7/2003 | Guillen | G06F 11/1417 709/220 |
| 2004/0103331 | A1 * | 5/2004 | Cooper | G06F 9/4418 713/323 |

(Continued)

OTHER PUBLICATIONS

"How To: Set Debug And Release Configurations," 2018, 2 Pages, Visual Studio 2015, https://msdn.microsoft.com/en-us/library/wx0123s5.aspx.

*Primary Examiner* — Paul R. Myers
(74) *Attorney, Agent, or Firm* — Haynes and Boone, LLP (57) ABSTRACT

A security module authentication system includes a processing system that is configured to authenticate a security module based on a processing system type of the processing system. The system also includes a Basic Input/Output System (BIOS) coupled to the processing system and that includes a BIOS storage device. The BIOS storage stores a plurality of security modules each of which corresponds to a different processing system type. The BIOS is configured to utilize any of the plurality of security modules to perform a secure boot. The BIOS storage also stores an image table that identifies a first location in the BIOS storage of a first security module of the plurality of security modules. The first security module is authenticable by the processing system based on the processing system type of the processing system.

20 Claims, 7 Drawing Sheets

(56) References Cited

U.S. PATENT DOCUMENTS

| | | | |
|---|---|---|---|
| 2007/0234092 A1* | 10/2007 | Freeman | G06F 9/4418 |
| | | | 713/323 |
| 2010/0077131 A1* | 3/2010 | Lam | G06F 12/0246 |
| | | | 711/103 |
| 2012/0072994 A1* | 3/2012 | Urien | H04L 63/06 |
| | | | 726/26 |
| 2013/0124229 A1* | 5/2013 | Cashman | G06Q 40/08 |
| | | | 705/4 |
| 2013/0124852 A1* | 5/2013 | Kain | H04L 63/20 |
| | | | 713/152 |
| 2014/0250290 A1* | 9/2014 | Stahl | G06F 21/575 |
| | | | 713/2 |
| 2014/0282856 A1* | 9/2014 | Duke | H04L 63/20 |
| | | | 726/1 |
| 2016/0099923 A1* | 4/2016 | Golla | H04W 12/04 |
| | | | 713/171 |
| 2018/0082059 A1* | 3/2018 | Bender | G06F 21/554 |

\* cited by examiner

SECURITY MODULE AUTHENTICATION SYSTEM

BACKGROUND

The present disclosure relates generally to information handling systems, and more particularly to authenticating a security module when booting information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include chipsets such as, for example, the Platform Controller Hub (PCH) available from INTEL® Corporation of Santa Clara, Calif., United States. Such chipsets may include One-Time-Programmable (OTP) Non-Volatile Memory (NVM) and/or other memory subsystems that utilize fuses such as In Field Programmable (IFP) fuses that may be burned during manufacturing to provide security information in the chipset (e.g., information associated with a public key such as a hash of a master public key) and/or enable particular features in the system. For example, security information provided in the chipset in such a manner and associated with a public key may be utilized to verify software or firmware (e.g., a Basic Input/Output System (BIOS)) that has been signed with an associated private key. Similarly, features enabled in the information handling system in such a manner may include security features such as, for example, BOOT GUARD available in systems provided by DELL® Inc. of Round Rock, Tex., United States, and PLATFORM TRUST TECHNOLOGY available from INTEL® corporation of Santa Clara, Calif., United States. Providing chipsets with information and enabling system features in such manner provides a root of trust for that information and those features.

In a specific example, when a security module such as BOOT GUARD is enabled, it may check authentication results of an Authenticated Code Module (ACM), available from INTEL® corporation of Santa Clara, Calif., United States. If the BOOT GUARD authentication check of the ACM fails, BOOT GUARD does not allow the system to boot. In conventional systems, the ACM may be included in the BIOS storage, and security information in the ACM is then authenticated against security information in a Platform Controller Hub (PCH). However, some computing systems have moved the security information to authenticate the ACM from the PCH to the central processing unit (CPU). As would be understood by one of skill in the art, CPUs may be provided in different versions such as, for example, a production version (also referred to as a Qualification Sample (QS)) or a pre-production version (also referred to as an Engineering Sample (ES)).

With regard to ACM authentication, a pre-production (e.g., a "debug") ACM may be authenticated with an ES CPU, while a production ACM may be authenticated with a QS CPU. However, a BIOS must select which ACM to use when compiling the BIOS. For example, when the computing system is powered on, the CPU loads the ACM from a firmware interface table (FIT) before the BIOS starts. As such, if the BIOS is built with a pre-production/debug ACM, the BIOS cannot boot a computing system with a QS CPU. Similarly, if the BIOS is built with a production ACM, the BIOS cannot boot a computing system with an ES CPU. These issues introduce complications during the development phases of computing systems when those computing systems may have ES CPUs or QS CPUs. A conventional solution is to provide two BIOS's, with a pre-production/debug ACM to support ES CPUs, and a production ACM to support QS CPUs. BIOS flashing code then checks the installed CPU type (e.g., ES or QS), and only allow BIOS to be updated when a matching ACM and CPU requirement (e.g., both production or both pre-production) is satisfied. However, such solutions require multiple different BIOS versions to perform conventional ACM authentication, and increase the chances of human errors produced in (and human intervention required for) flashing a BIOS. Furthermore, having multiple different BIOS versions increases production costs and manufacturing times, while hindering the supply chain and decreasing the efficiency of the manufacturing process.

Accordingly, it would be desirable to provide an improved security module authentication system.

SUMMARY

According to one embodiment, an Information Handling System (IHS), includes a Basic Input/Output System (BIOS) storage device; a processing system coupled to the BIOS storage device; and a memory system that is coupled to the processing system and that includes instructions that, when executed by the processing system, causes the processing system to provide a BIOS update engine that is configured to: provide a BIOS to the BIOS storage device coupled to the processing system; store a plurality of security modules provided by the BIOS in the BIOS storage device, wherein each of the plurality of security modules corresponds to a different processing system type, and wherein the BIOS is configured to utilize any of the plurality of security modules to perform a secure boot; and provide a first entry in an image table provided by the BIOS with a first location in the BIOS storage device of a first security module, wherein the first security module is authenticable by the processing system based on the processing system type of the processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
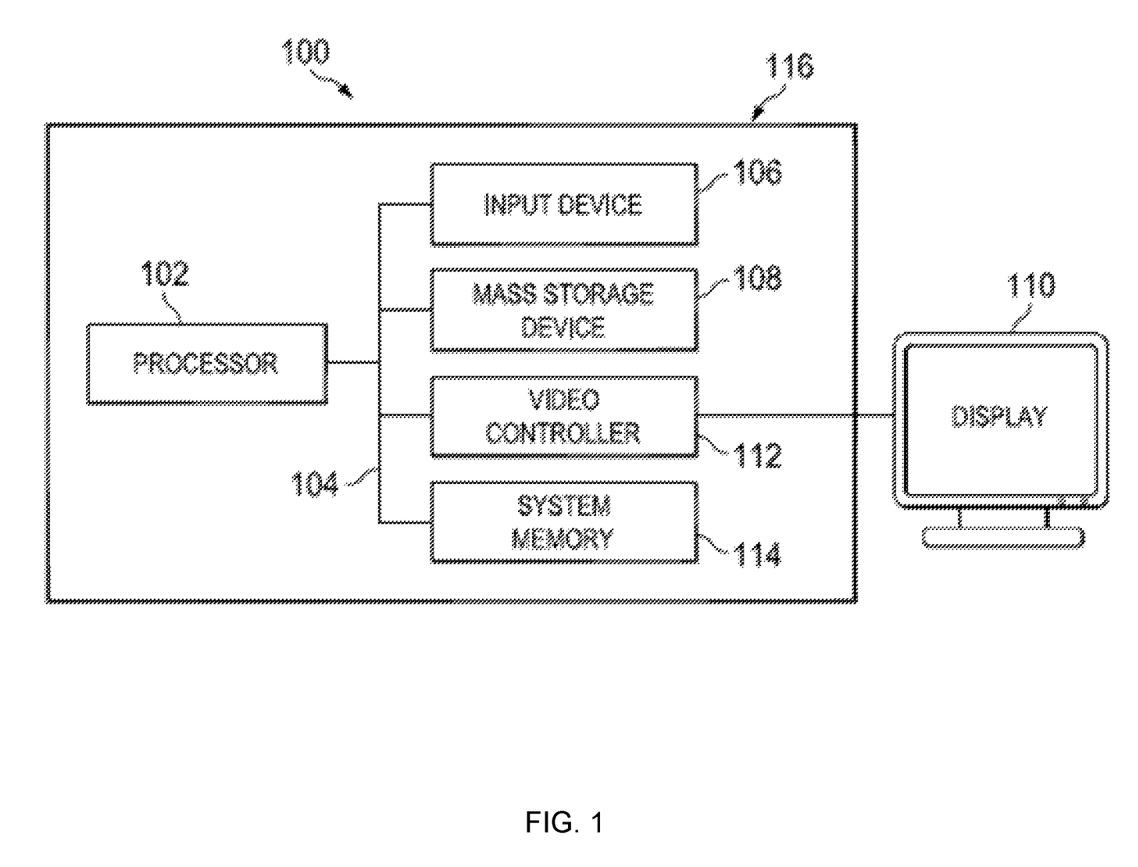
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
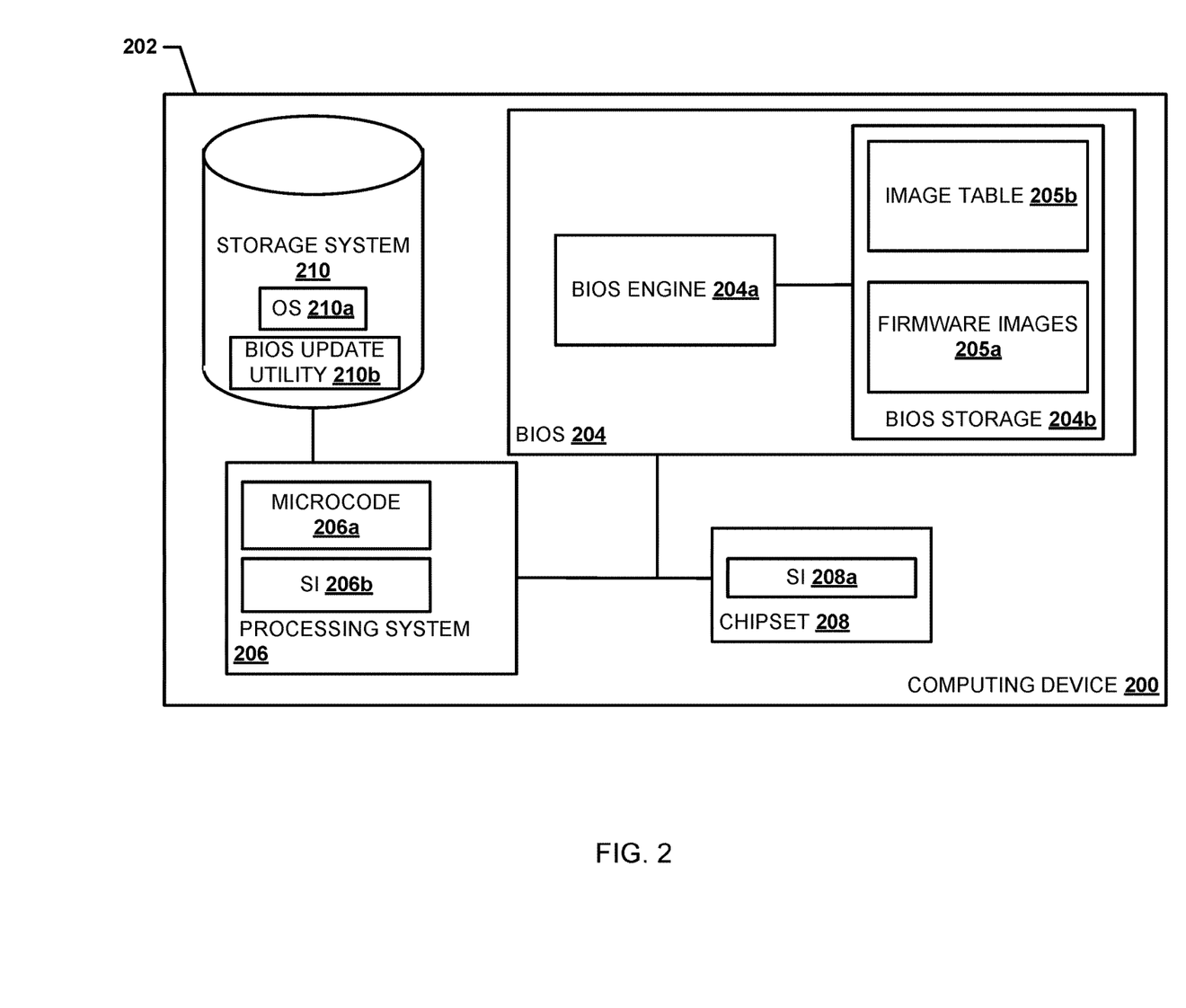
FIG. 2 is a schematic view illustrating an embodiment of a computing device that includes a security module authentication system.

Referring now to FIG. 2, an embodiment of a computing device 200 is illustrated that may be provided by the IHS 100 discussed above with reference to FIG. 1, and/or may include some or all of the components of the IHS 100. In specific embodiments, the computing device 200 may be a server device, a desktop computing device, a laptop/notebook computing device, a tablet computing device, a mobile phone, and/or a variety of other computing devices that would be apparent to one of skill in the art in possession of the present disclosure. In the illustrated embodiment, the computing device 200 includes a chassis 202 that houses the components of the computing device 200, only some of which are illustrated in FIG. 2. For example, the chassis 202 may house a Basic Input/Output System (BIOS) processing subsystem (not illustrated, but which may include the processor 102 discussed above with reference to FIG. 1) and a BIOS memory subsystem (not illustrated, but which may include the memory 114 discussed above with reference to FIG. 1) that includes instructions that, when executed by the BIOS processing subsystem, cause the BIOS processing subsystem to provide a BIOS 204 that is configured to perform the functions of the BIOS and/or computing devices discussed below.

As would be appreciated by one of skill in the art in possession of the present disclosure, the BIOS 204 may be provided by non-volatile firmware (e.g., provided by the combination of the BIOS processing subsystem and BIOS memory subsystem discussed above) that is configured to perform hardware initialization during a booting process of the computing device 200, as well as provide runtime services for operating systems and/or other programs/applications executed on the computing device 200. While referred to as a "BIOS", one of skill in the art in possession of the present disclosure will recognize that the BIOS 204 may be provided according to the Unified Extensible Firmware Interface (UEFI) specification and, as such, may include or be coupled to a software interface between an operating system provided by the computing device 200 and platform firmware included in the computing device 200. Thus, the BIOS 204 may be provided by UEFI firmware that may also provide UEFI functionality, legacy support for BIOS services, and/or other functionality while remaining within the scope of the present disclosure as well.

In the illustrated embodiment, the BIOS 204 includes a BIOS engine 204a that may be provided, for example, by the BIOS processing subsystem discussed above executing instructions included on the BIOS memory subsystem discussed above. One of skill in the art in possession of the present disclosure will recognize that the BIOS engine 204a is illustrated and described herein as providing BIOS functionality of the present disclosure, and that the BIOS 204 may perform a variety of other BIOS functionality while remaining within the scope of the present disclosure as well. The BIOS 204 also includes a BIOS storage 204b that is coupled to the BIOS engine 204a (e.g., via a coupling between the BIOS storage 204b and the BIOS processing subsystem), and that may store any of the information utilized as discussed below (e.g., firmware images 205a, an image table 205b such as a firmware image table (FIT), and/or any other BIOS information, modules, and binaries that would be apparent to one of skill in the art in possession of the present disclosure.) In a specific example, the BIOS storage 204b may be provided by a BIOS Serial Peripheral Interface (SPI) flash storage device, although other storage subsystems will fall within the scope of the present disclosure as well.

The chassis 202 may also house a processing system 206 (e.g., a Central Processing Unit (CPU)) that is coupled to the BIOS engine 204a in the BIOS 204 (e.g., via a coupling between the BIOS processing subsystem and the processing system 206.) In various embodiments, the processing system 206 may be configured to load BIOS instructions that provide the BIOS 204, execute the BIOS instructions to provide the BIOS 204 on one or more of cores of the processing system 206, and/or perform other central processing system functionality that would be apparent to one of skill in the art in possession of the present disclosure. The processing system 206 may include microcode 206a that is used to authenticate the BIOS 204 before the BIOS 204 is initiated. For example, the microcode 206a may be stored in a read only memory (ROM) device included in the processing system 206. The processing system 206 may also store security information (SI) 206b (e.g., information associated with a public key such as a hash of a master public key) used for authenticating a security module of the BIOS 204. In an embodiment, the security information 206b may be stored on a plurality of programmable fuses. For example, the programmable fuses may be provided by Programmable Read-Only Memory (PROM) that is part of the processing system 206 and that may include One-Time Programmable Non-Volatile Memory (OTP NVM) that allows settings for each of a plurality of bits to be locked via programming of the programmable fuses (e.g., which may be provided by fuses, anti-fuses, etc.), although one of skill in the art in possession of the present disclosure will appreciate that other OTP memory, fuses, and/or other components will fall within the scope of the present disclosure as well. In the examples provided below, any of the programmable fuses may be "burnt" (e.g., the programmable fuses are melted, blown, or otherwise programmed) to provide cells that either indicate a "0" or a "1". However, one of skill in the art in possession of the present disclosure will recognize that one-time-programmable fuses may be programmed in other manners while remaining within the scope of the present disclosure.

The chassis 202 may also house a chipset 208 that is coupled to the BIOS engine 204a in the BIOS 204 (e.g., via a coupling between the BIOS processing subsystem and the chipset 208) and to the processing system 206. In the embodiments discussed below, the chipset 208 may be provided by a Platform Controller Hub (PCH) available from INTEL® corporation of Santa Clara, Calif., United States, although other chipsets and/or combinations of electronic components that manage data flow between a processing system, a memory system, and peripherals in the computing device 200 may benefit from the teachings of the present disclosure and thus are envisioned as falling within its scope as well. As illustrated, the chipset 208 includes security information 208a (e.g., information associated with a public key such as a hash of a master public key) used for authenticating a BIOS 204. The security information 208a may be stored on a plurality of programmable fuses. For example, the programmable fuses may be provided by Programmable Read-Only Memory (PROM) that is part of the chipset 208 and that may include One-Time Programmable Non-Volatile Memory (OTP NVM) that allows settings for each of a plurality of bits to be locked via programming of the programmable fuses (e.g., which may be provided by fuses, anti-fuses, etc.), although one of skill in the art in possession of the present disclosure will appreciate that other OTP memory, fuses, and/or other components will fall within the scope of the present disclosure as well. In the examples provided below, any of the programmable fuses may be "burnt" (e.g., the programmable fuses are melted, blown, or otherwise programmed) to provide cells that either indicate a "0" or a "1". However, one of skill in the art in possession of the present disclosure will recognize that one-time-programmable fuses may be programmed in other manners while remaining within the scope of the present disclosure.

The chassis 202 may also house a storage system 210 that, in the illustrated embodiment, is coupled to the processing system 206, although the storage system 210 may be coupled to the BIOS 204 while remaining within the scope of the present disclosure as well. The storage system 210 may include any of a variety of storage devices and/or other components that allow for the storage of an operating system (OS) 210a that may be loaded during the booting process by the BIOS 204 and the processing system 206, and executed while the computing device 200 is in a runtime environment. The storage system 210 may also include a BIOS update utility 210b that may update/flash the BIOS 204 to the BIOS storage 204b, as well as any of the other data discussed below.

Figure 3:
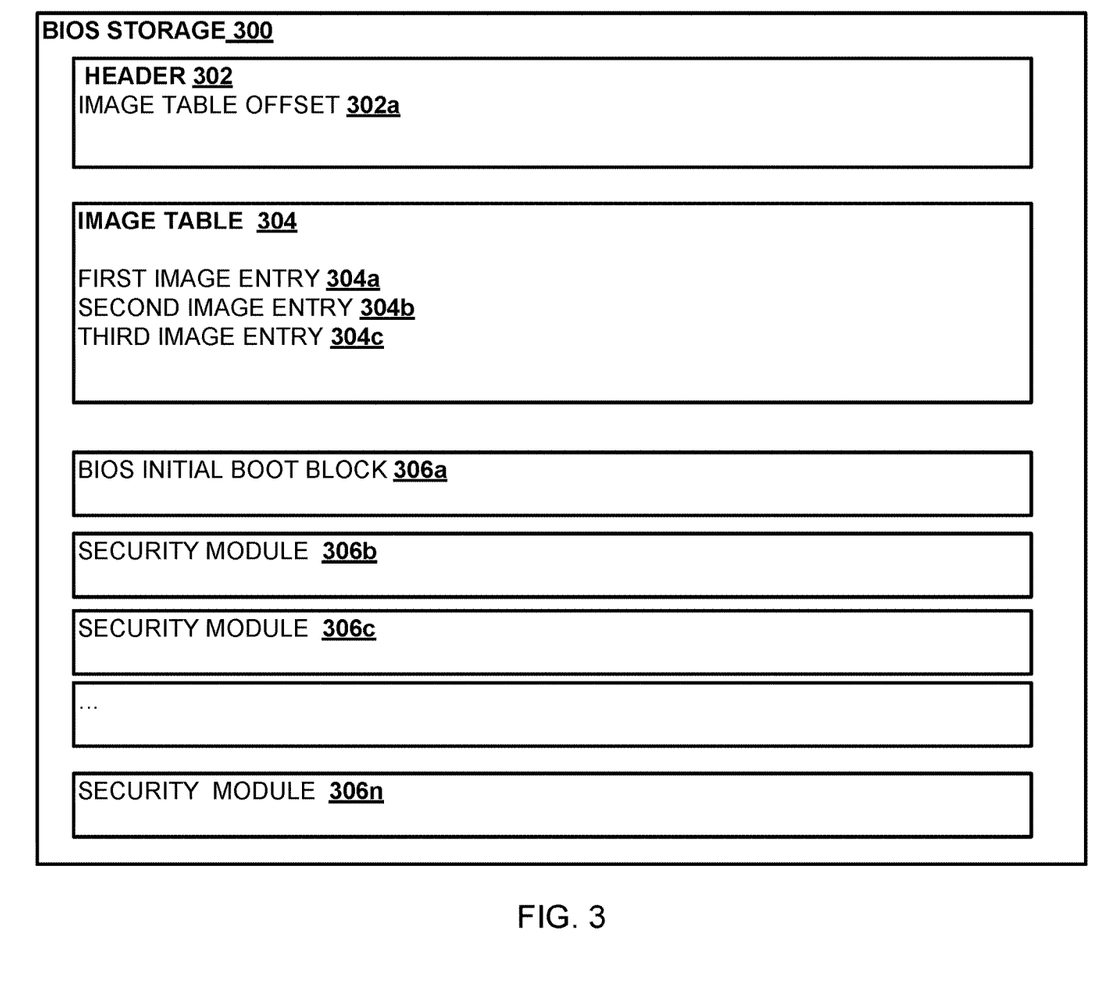
FIG. 3 is a schematic view illustrating an embodiment of a BIOS storage that may be provided in the BIOS of FIG. 2.

Referring now to FIG. 3, an embodiment of BIOS storage 300 is illustrated that may be the BIOS storage 204b discussed above with reference to FIG. 2. As such, one of skill in the art will recognize that the BIOS storage 300 may be provided by a BIOS SPI flash storage device in many of the embodiments discussed below. In the illustrated embodiment, the BIOS storage 300 includes a header region 302. The header region 302 may provide an offset 302a to an image table 304, which may be the image table 205b discussed above with reference to FIG. 2. The image table 304 may provide a plurality of entries (e.g., a first entry 304a, a second entry 304b, and a third entry 304c as illustrated in FIG. 3) that include offsets to locations of firmware images (e.g., a BIOS initial boot block 306a, a security module 306b, a security module 306c, and/or up to a security module 306n as illustrated in FIG. 3), which may be the firmware images 205a discussed above with reference to FIG. 2, and which may include any other firmware image information that would be apparent to one of skill in the art in possession of the present disclosure. In an example, the image table 304 may be a firmware image table (FIT) where a physical address (e.g., 4 GB minus 0x40) in the BIOS storage 300 contains a pointer to the first byte of the FIT header (e.g., 0xFFF_FFFC0). As would be appreciated by one of skill in the art in possession of the present disclosure, the FIT may be provided by a BIOS data structure that includes multiple FIT entries, and may be generated when compiling the BIOS 204 based on the size and locations of firmware images. For example, each entry in the FIT may be 16 bytes in length and include the starting address, size, version, and type for each entry. During a booting process, the microcode 206a in the processing system 206 may parse and process the FIT before handing over execution to the BIOS 204 and/or an authenticated code module (ACM), an initial boot block (IBB), or a BIOS reset vector (e.g., at FFFFFFF0h). In a specific example, the FIT may reside in the firmware address range of (4 GB−0x40) to (4 GB-16 MB).

In an embodiment of the present disclosure, the firmware images 205a may include images of a plurality of security modules (e.g., the security modules 306b-306n in FIG. 3). The firmware images 205a may also include an image of a BIOS IBB 306a and/or any other firmware images that would be apparent to one of skill in the art in possession of the present disclosure. For example, each security module 306b-306n may be provided by an authentication code module (ACM). In an embodiment, each security module 306b-306n corresponds with a processing system type. For example, the security module 306b may be an Engineering Sample (ES) ACM and the security module 306c may be a Quality Sample (QS) ACM. However, in other embodiments, additional security module types may be provided such as a Production Value (PV) ACM, and/or any other security module types that would be apparent to one of skill in the art in possession of the present disclosure. Each security module 306b-306n may include security information that may be provided by a signature using a private key that is associated with the public key used for the security information 206b in the processing system 206. Thus, the security information for each security module 306b-306n is unique to the processing system type with which it corresponds. As discussed below, once the security information of a security module has been authenticated by the processing system 206 via the microcode 206a, the security module may be executed by the BIOS engine 204a to perform an authentication process to authenticate the BIOS 204 before the BIOS initial boot block 306a of the BIOS 204 receives control of the booting process.

Figure 4:
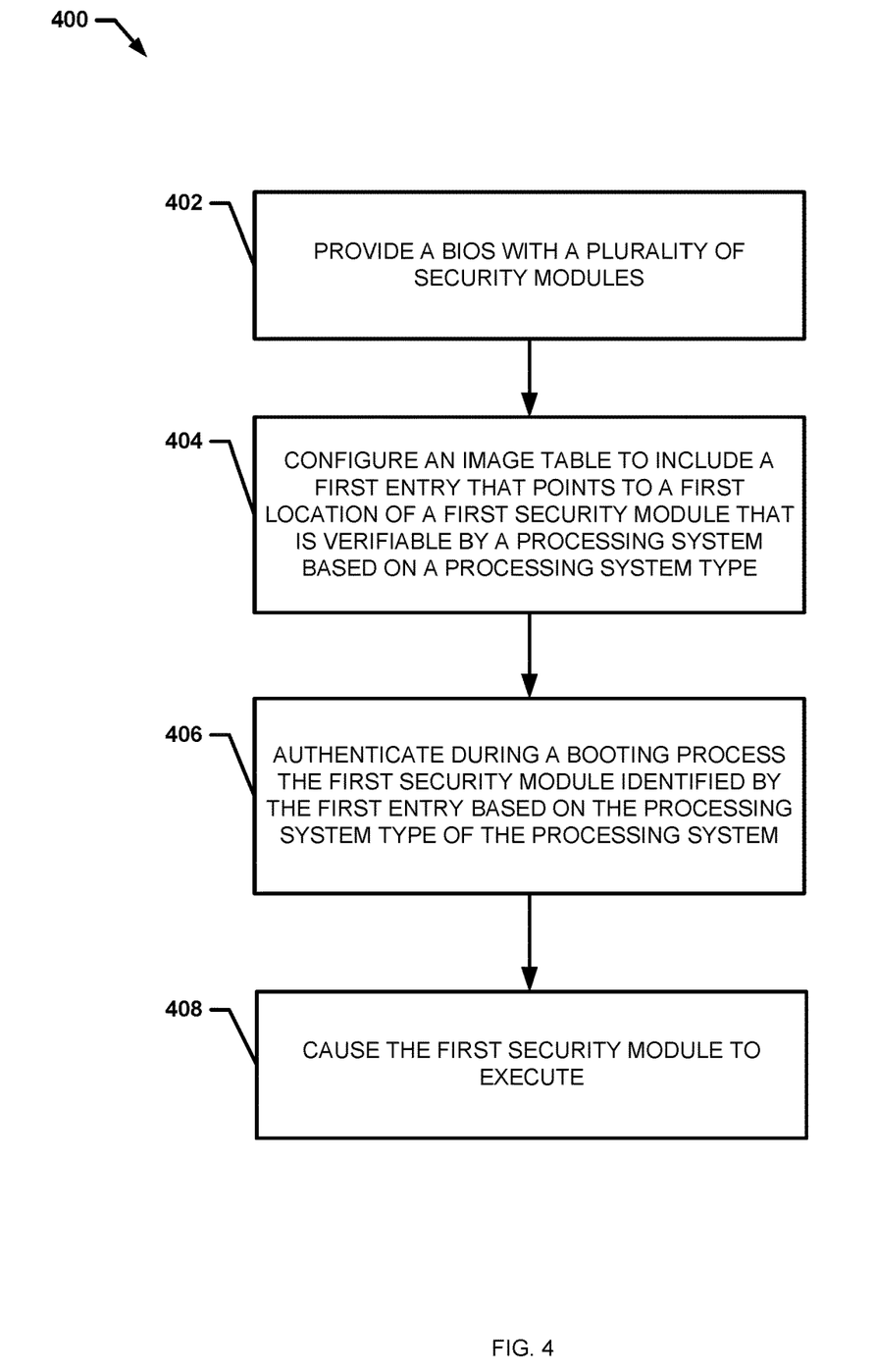
FIG. 4 is a flow chart illustrating an embodiment of a method for authenticating a security module.

Referring now to FIG. 4, an embodiment of a method 400 to provide security module authentication is illustrated. As discussed above, conventional computing devices require at least two BIOS versions when updating/flashing a BIOS in order to ensure that security information for different types of security modules (e.g., pre-production and production ACMs) included in respective BIOS's corresponds with security information for the type of processing system (e.g., a pre-production or production CPU) that is provided in the computing device. However, providing two BIOS's when flashing the BIOS further complicates a process that can result in an unusable computing device if the correct BIOS is not flashed properly. Furthermore, having multiple different BIOS versions increases production costs and manufacturing times, while hindering the supply chain and decreasing the efficiency of the manufacturing process. The systems and methods of the present disclosure solve these issues by providing a single BIOS that, when compiled, includes a plurality of security modules, which allows a BIOS update utility to update an image table provided with the BIOS in order to point to the type of security module that corresponds with the type of processing system that is provided in the computing device.

The method 400 begins at block 402 where a BIOS is compiled with a plurality of security modules. In an embodiment of block 402, the BIOS 204 may be compiled with a plurality of security modules (e.g., at least two of the security module 306b, the security module 306c, and/or up to the security module image 306n illustrated in FIG. 3). Each security module 306b-306n may correspond to a respective processing system type of the processing system 206. For example, the security module 306b may be provided by a pre-production/debug ACM that corresponds with an pre-production/ES processing system, the security module 306c may be provided by a production ACM that corresponds with a production/QS processing system, and the security module image 306n may be provided by a PV ACM that corresponds with a PV processing system. As discussed above, each processing system type may include distinct security information 206b such as, for example, a hash of a public key that is stored in One-Time-Programmable (OTP) Non-Volatile Memory (NVM), and/or other memory subsystems that utilize fuses such as In Field Programmable (IFP) fuses that may be burned during manufacturing to provide security information 206b in the processing system 206. As such, security information provided in the security module included in the BIOS 204 must match the security information 206b of the processing system 206, and any number of different security modules may be included in the BIOS such that one of those security modules 306b-306n will correspond with the processing system type of any processing system that is provided with the computing device 200.

The method 400 then proceeds to block 404 where an image table within the BIOS is configured to include a first entry that points to a first location of a first security module that is verifiable by the processing system based on a processing system type. In an embodiment of block 404, a BIOS update engine may configure the image table 304 to include an entry that points to a first location of a first security module in the BIOS storage 300 that is verifiable by the processing system 206 based on the processing system type of the processing system 206. In various embodiments, the BIOS updating engine is provided by execution of the BIOS update utility 210b, which may be executed by the processing system 206 and/or the BIOS processing subsystem when the computing device 200 is in a runtime environment (e.g., when the operating system 210a is loaded), during the booting process by loading the BIOS update utility 210b from an external memory device before the operating system 210a is loaded, and/or at any other time or during any other BIOS update utility providing process (e.g., to update or otherwise flash the BIOS 204 on the computing device 200) that would be apparent to one of skill in the art in possession of the present disclosure. Various embodiments of block 404 are discussed below with reference to FIGS. 5, 6, and 7.

Figure 5:
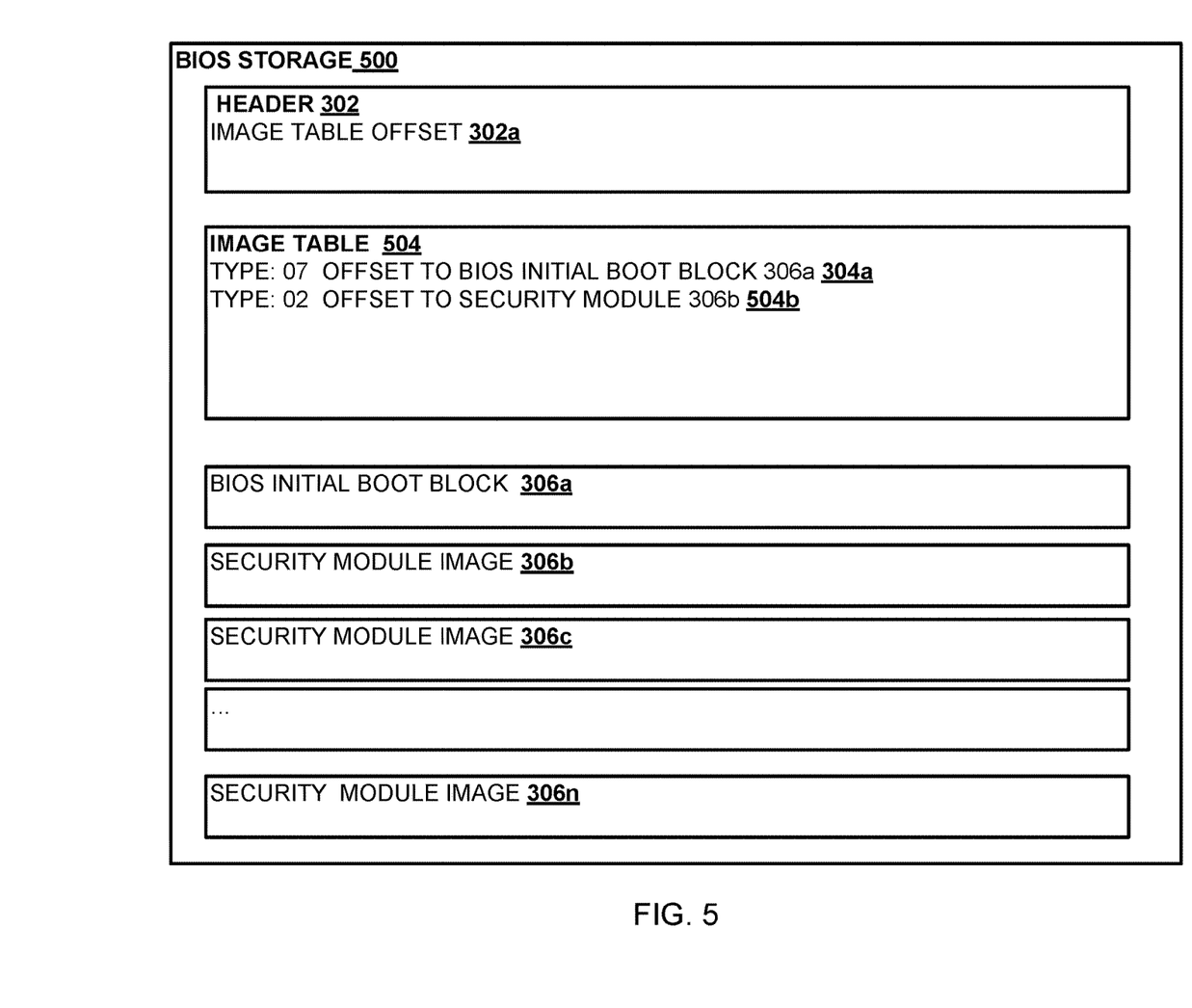
FIG. 5 is a schematic view illustrating an embodiment of the BIOS storage of FIG. 3 following configuration of an image table.

In an embodiment of block 404 and with reference to the BIOS storage 500 of FIG. 5, which may be BIOS storage 300 discussed above with reference to FIG. 3 and/or the BIOS storage 206b discussed above with reference to FIG. 2, when the BIOS update utility 210b is updating/flashing the BIOS 204 to the BIOS storage 500, the BIOS update utility 210b may determine the processing system type of the processing system 206. For example, the BIOS update utility 210b may determine whether the processing system type of the processing system 206 is an pre-production/ES processing system type, a production/QS processing system type, a PV processing system type, or any other processing system type that would be apparent to one of skill in the art in possession of the present disclosure. The BIOS update utility 210b may obtain the processing system type from a register included on the processing system 206 that provides the processing system type, and/or from any other storage location in the computing device 200 that would be apparent to one of skill in the art in possession of the present disclosure. In a specific example, the image table 304 may include only one security module entry 504b for a security module offset that identifies the location of the security module in the BIOS storage 500. Thus, the BIOS update utility 210b may determine a security module from the plurality of security modules 306b-306n that corresponds with the processing system type of the processing system 206, and provide the location of that security module in the security module entry 504b of the BIOS storage 500. For example, the processing system 206 may be of a pre-production/ES processing system type and the security module 306b may be a pre-production/debug ACM. The BIOS update utility 210b may update the security module entry 504*b* in the image table 504 (e.g., a FIT) with the location of security module 306*b* in the BIOS storage 500. In a specific example, a BIOS ACM entry in a FIT may be denoted by a 02 FIT entry type, and the microcode 206*a* may be configured to reference that FIT entry type when obtaining the ACM location during the booting process.

In various embodiments, when the BIOS update utility 210*b* is updating an existing BIOS storage 500, the BIOS update utility 210*b* may determine that the security module entry 504*b* in the image table 504 identifies a second location of a security module 306*c* included in the plurality of security modules 306*b*-306*n*, and may then determine that the security module 306*c* is not verifiable by the processing system 206 based on the processing system type of the processing system 206. In response to determining that the security module entry 504*b* in the image table 504 identifies the location of the security module 306*c*, the BIOS update utility 210*b* may then update the security module entry 504*b* in the image table 504 to identify the location in the BIOS storage 500 of the security module 306*b* that provides, in the above example, the pre-production/debug ACM that is verifiable by the processing system 206 based on the pre-production/ES processing system type of the processing system 206.

Figure 6:
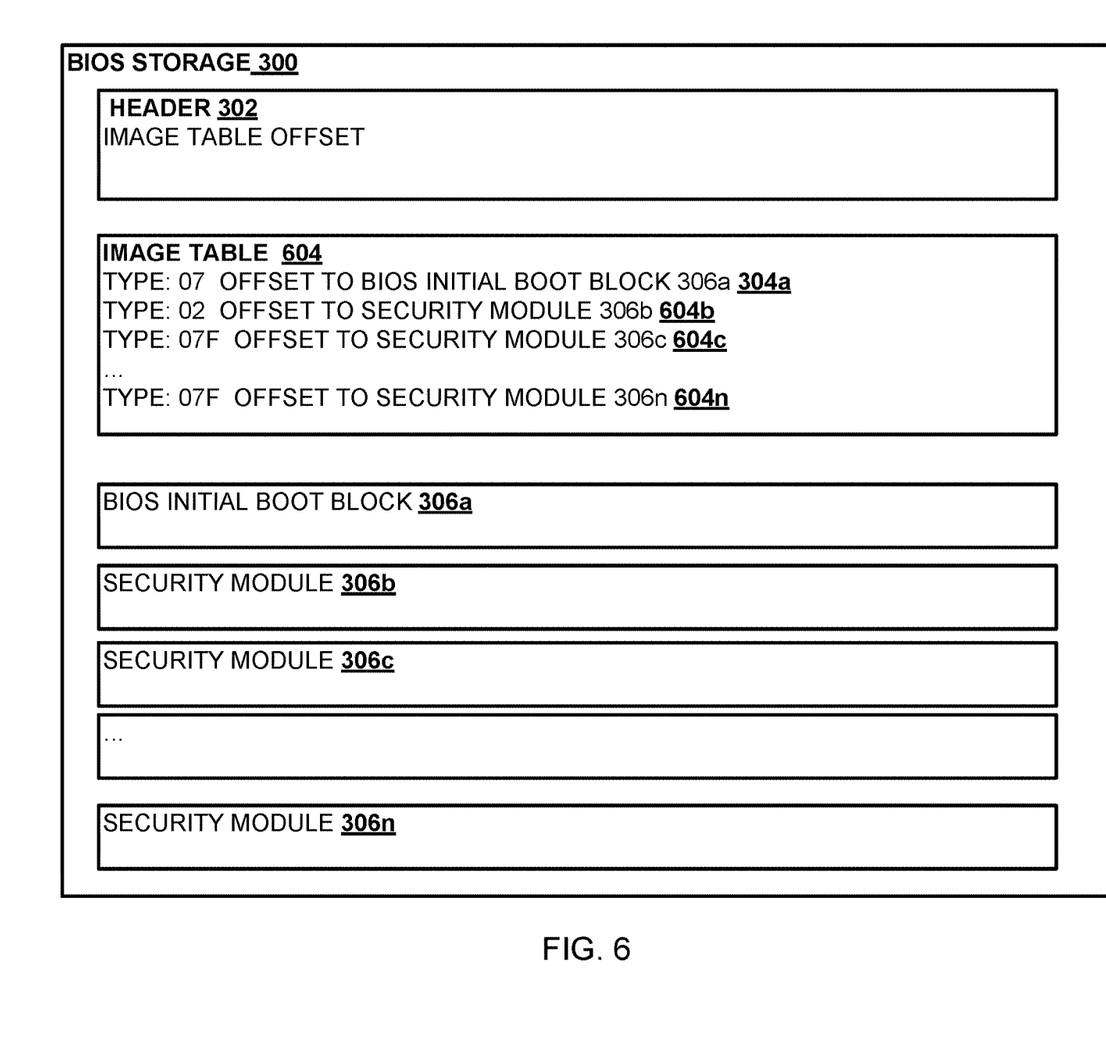
FIG. 6 is a schematic view illustrating an embodiment of the BIOS storage of FIG. 3 following configuration of an image table.

In another embodiment of block 404 and with reference to the BIOS storage 600 of FIG. 6, which may be BIOS storage 300 discussed above with reference to FIG. 3 and/or the BIOS storage 206*b* discussed above with reference to FIG. 2, when the BIOS update utility 210*b* is updating/flashing the BIOS 204 to the BIOS storage 600, the BIOS update engine may determine the processing system type of the processing system 206. For example, the BIOS update utility 210*b* may determine whether the processing system type of the processing system 206 is an pre-production/ES processing system type, a production/QS processing system type, a PV processing system type, or any other processing system type that would be apparent to one of skill in the art in possession of the present disclosure. The BIOS update utility 210*b* may obtain the processing system type from a register included on the processing system 206 that provides the processing system type, and/or from any other storage location in the computing device 200 that would be apparent to one of skill in the art in possession of the present disclosure. In a specific example, the image table 604 may include a plurality of security module entries 604*b*-604*n*, and each security module entry 604*b*-604*n* may point or otherwise include an offset to the location in the BIOS storage 600 of a respective security module 306*b*-306*n*. For example, the security module entry 604*b* may include an offset to a location in the BIOS storage 600 of the security module 306*b*, the security module entry 604*c* may include an offset to the location in the BIOS storage 600 of the security module 306*c*, and the security module entry 604*n* may include an offset to the location in the BIOS storage 600 of the security module 306*n*. The BIOS update utility 210*b* may determine a security module from the plurality of security modules 306*b*-306*n* that corresponds with the processing system type of the processing system 206, and set that security module entry as valid, while setting the other security module entries as invalid. For example, the processing system 206 may be of a pre-production/ES processing system type and the security module 306*b* may be a pre-production/debug ACM. The BIOS update utility 210*b* may set the security module entry 604*b* that points to the security module 306*b* (e.g., a pre-production/debug ACM) as valid in the image table 604), while invalidating the security module entry 604*c* that points to the security module 306*c* (e.g., a production ACM) and the security module entry 604*n* that points to the security module image 306*n* (e.g., a PV ACM). In a specific example, a valid BIOS ACM entry is denoted in a FIT by a "02" FIT entry type, and the microcode 206*a* may be configured to reference that entry type when obtaining the security module location of the BIOS storage 600 during the booting process. Thus, in this example, the BIOS update utility 210*b* may set the security module entry 604*b* in the image table 304 as entry type: "02" to indicate its validity, while setting the security module entries 604*c* up to 604*n* as entry type: "07F", which instructs the microcode 206*a* to skip the entry or indicates that the entry is unused.

Figure 7:
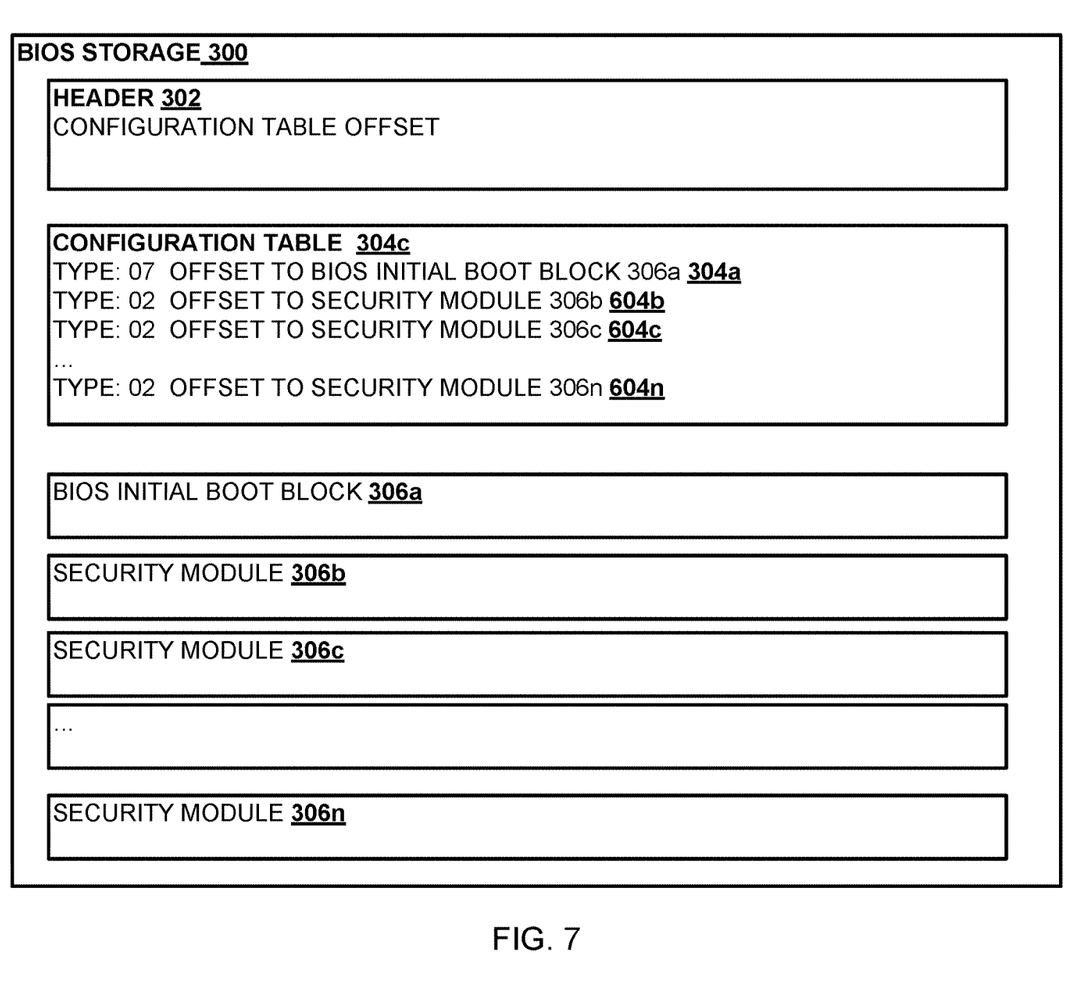
FIG. 7 is a schematic view illustrating an embodiment of the BIOS storage of FIG. 3 following configuration of an image table.

In another embodiment of block 404 and with reference to the BIOS storage 700 of FIG. 7, which may be BIOS storage 300 of discussed above with reference to FIG. 3 and/or the BIOS storage 206*b* discussed above with reference to FIG. 2, when the BIOS update utility 210*b* is updating/flashing the BIOS 204 to the BIOS storage 700, the BIOS update utility 210*b* may not determine the processing system type of the processing system 206 as was done in the embodiments described with reference to FIG. 5 and FIG. 6 above. Rather, the BIOS update utility 210*b* may provide an image table 704 that may include a plurality of security module entries 704*b*-704*n*, and each security module entries 704*b*-704*n* may point or otherwise include an offset to the location in the BIOS storage 700 of its respective security module 306*b*-306*n*. For example, the security module entry 704*b* may include an offset to a location in the BIOS storage 700 of the security module 306*b*, the security module entry 704*c* may include an offset to the location in the BIOS storage 700 of the security module 306*c*, and the security module entry 604*n* may include an offset to the location in the BIOS storage 700 of the security module image 306*n*. Continuing with the scenario above where the processing system 206 is a pre-production/ES processing system type, with the first type security module 306*b* being a pre-production/debug ACM, the second type security module 306*c* being a production ACM, and the nth type security module image 306*n* being a PV ACM, the BIOS update utility 210*b* may set each security module entry 704*b*-704*n* valid in the image table 704 (e.g., a FIT). In a specific example, a BIOS ACM entry is denoted in a FIT by a 02 FIT entry type, and the microcode 206*a* may be configured to reference that entry type when obtaining the security module's location in the BIOS storage 700 during the booting process. Thus, the BIOS update utility 210*b* may label each security module entry 704*b*-704*n* in the image table 704 as type: "02". In various embodiments of the present disclosure, and as discussed in further detail below, the microcode 206*a* may be configured to select one of the security module entries 704*b*-704*n* during the booting process of the computing device 200 based on the processing system type of the processing system 206, which may be determined by the microcode 206*a*.

The method 400 then proceeds to block 406 where the first security module identified by the first entry is authenticated based on the processing system type of the processing system. In an embodiment of block 406, at power on or other initialization of the computing device 200, the processing system 206 may execute the microcode 206*a* from the processing system ROM. The execution of the microcode 206*a* providing for the scanning of the entries 304*a*-304*c* of the image table 304 until a valid security module entry is found. As discussed with reference to the embodiments of the image tables 504 and 604 provided in the discussion of FIG. 5 and FIG. 6, respectively, there may be only one valid security module entry (e.g., 504b and 604b, respectively).

However, as discussed above in the embodiment of the image table 704 with reference to FIG. 7, there may be a plurality of valid security module entries (e.g., security module entries 704b, 704c, and 704n). In this embodiment, the execution of the microcode 206a may provide for the determination of the processing system type of the processing system 206, along with the identification of a security module entry from the plurality of security module entries 704b, 704c, and 704n that corresponds with the processing system type. In an example, the execution of the microcode 206a may provide for the determination of a processing system identifier supported by the microcode 206a (e.g., from its own header 302), and that processing system identifier may be used to determine the processing system type. The execution of the microcode 206a may also provide for the parsing of a header of each security module 306b-306n to determine which security module 306b-306n is authenticated by the security information 206b in the processing system 206. For example, the execution of the microcode 206a may provide for the determination of whether the security modules 306b-306n are production key signed for production/QS processing system types, or pre-production/debug key signed for pre-production/ES processing system types.

In an embodiment of block 406, after the execution of the microcode 206a provides for the location of the correct security module from the security module entries 704b-704c, the execution of the microcode 206a may provide for the authentication of that security module based on the processing system type of the processing system 206. For example, the execution of the microcode 206a may provide for the comparing of the security information 206b that is based on the processing system type of the processing system 206 with the security information that is provided with that security module. If the security information 206b in the processing system 206 does not correspond with the security information of that security module, the processing system 206 will halt the booting process.

However, if the security module is authenticated based on the processing system type, the method 400 proceeds to block 408 where the processing system causes the first security module to execute. In an embodiment of block 408 and in response to the authentication of the security module, the execution of the microcode 206a may provide for the loading of the security module, and execution of the booting process may be passed to the security module (e.g., executed by the BIOS engine 204a.) The security module may then continue the booting process by performing a measured launch and establishing a chain of trust via the authentication of additional security information (e.g., a Key Manifest signature) with security information 208a (e.g., a Key Manifest public key or a hash of the Key Manifest public key) located in the chipset 208, and/or using any other security information that would be apparent to one of skill in the art in possession of the present disclosure. After the security module has completed the authentication of the BIOS 204, the security module passes control of the booting process over to the BIOS initial boot block 306a, and booting operations are performed to load the operating system 210a such that the computing device 200 enters a runtime environment.

In various embodiments of the present disclosure, having a single BIOS 204 that includes respective security modules for each processing system type of respective processing systems that may be provided in a computing device may be useful for troubleshooting the computing device 200. For example, the BIOS update utility 210b may be configured such that a user may manually select a security module that is incompatible with the existing processing system 206. In some embodiments, the user may select or provide a command for the BIOS update utility 210b to flash the incompatible security module to the BIOS storage 204b. For example, a user may be receiving an internal error (e.g., iERR) from the computing device 200 that includes a production/QS processing system, and the user may run the BIOS update utility 210b to flash a pre-production/debug security module that is associated with a pre-production/ES processing system. The computing device 200 will not boot after flashing the pre-production/debug security module, which is expected. The user may install then a pre-production/ES processing system to check if the iERR occurs with the pre-production/ES processing system, which can indicate whether the production/QS processing system was the cause of the iERR or not.

Thus, systems and methods have been described that provide for authenticating a security module. A single BIOS may be provided in a computing device that includes different type security modules that may be authenticated by a processing system based on the processing system type of that processing system. The BIOS may be compiled with the plurality of security modules that each corresponds to a different processing system type and, during flashing of the BIOS to BIOS storage, a BIOS update utility may determine the processing system type of the processing system, and adjust an image table of the BIOS storage to point to the corresponding security module having matching security module type for that processing system such that when the processing system is powered on, the processing system locates the pointer and authenticates the corresponding security module based on its processing system type. In other embodiments, the BIOS update utility may update the image table to point to each security module included in the BIOS storage, and upon initialization of the processing system, the processing system may determine its own processing system type and determine which of the security modules corresponds to its processing type. In either embodiment, the processing system may authenticate the security module and pass control of the booting process to the security module to further authenticate the BIOS before passing control of the booting process to the BIOS. The systems and methods of the present disclosure allow for a single version of the BIOS image to be utilized with a variety of computing devices having different configurations (e.g., different processing system types), eliminating the need for the multiple different BIOS versions that are required for conventional security module authentication based on processing system type, while reducing or eliminating human errors produced in (and human intervention required for) flashing a BIOS. As such, the systems and methods of the present disclosure may be utilized to reduce production costs and manufacturing times, while easing the supply chain and increasing the efficiency of the manufacturing process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A security module authentication system, comprising:
a chassis;
a processing system that is located in the chassis and that is configured to authenticate a security module based on a processing system type of the processing system; and
a Basic Input/Output System (BIOS) that is located in the chassis and coupled to the processing system, wherein the BIOS includes a BIOS storage storing:
a plurality of security modules, wherein each of the plurality of security modules corresponds to a different processing system type, and wherein the BIOS is configured to utilize any of the plurality of security modules to perform a secure boot; and
an image table that identifies a first location in the BIOS storage of a first security module of the plurality of security modules, wherein the first security module is authenticable by the processing system based on the processing system type of the processing system.

2. The system of claim 1, wherein the image table identifies a second location in the BIOS storage of a second security module of the plurality of security modules, and wherein the second security module is not authenticable by the processing system based on the processing system type of the processing system.

3. The system of claim 1, further comprising:
a BIOS update engine coupled to the BIOS, wherein the BIOS update engine is configured, during a BIOS updating operation, to:
store the plurality of security modules in the BIOS storage; and
configure a first entry in the image table with the first location of the first security module.

4. The system of claim 3, wherein the processing system is configured to:
determine, during a booting process, the processing system type of the processing system;
locate the first entry in the image table based on the processing system type; and
authenticate the first security module identified by the first entry based on the processing system type of the processing system and, in response, cause the first security module to execute.

5. The system of claim 3, wherein the BIOS update engine is further configured to:
determine the processing system type of the processing system, wherein the configuring the first entry in the image table with the first location of the first security module includes:
determining that the first entry in the image table identifies a second location of a second security module of the plurality of security modules, wherein the second security module is not authenticable by the processing system based on the processing system type of the processing system; and
update, in response to determining that the first entry in the image table identifies the second location of the second security module, the first entry in the image table to identify the first location of the first security module that is authenticable by the processing system based on the processing system type of the processing system.

6. The system of claim 3, wherein the BIOS update engine is further configured to:
determine the processing system type of the processing system, wherein the configuring the first entry in the image table with the first location of the first security module includes:
invalidating a second entry in the image table that identifies a second location of a second security module of the plurality of security modules, wherein the second security module is not authenticable by the processing system based on the processing system type of the processing system.

7. The system of claim 6, wherein the processing system is configured to:
bypass, during a booting process, the invalidated second entry in the image table; and
authenticate the first security module identified by the first entry based on the processing system type of the processing system and, in response, cause the first security module to execute.

8. An Information Handling System (IHS), comprising:
a Basic Input/Output System (BIOS) storage device;
a processing system coupled to the BIOS storage device; and
a memory system that is coupled to the processing system and that includes instructions that, when executed by the processing system, causes the processing system to provide a BIOS update engine that is configured to:
provide a BIOS to the BIOS storage device coupled to the processing system;
store a plurality of security modules provided by the BIOS in the BIOS storage device, wherein each of the plurality of security modules corresponds to a different processing system type, and wherein the BIOS is configured to utilize any of the plurality of security modules to perform a secure boot; and
provide a first entry in an image table provided by the BIOS with a first location in the BIOS storage device of a first security module, wherein the first security module is authenticable by the processing system based on the processing system type of the processing system.

9. The IHS of claim 8, wherein the BIOS update engine is further configured to:
provide a second entry in the image table that identifies a second location in the BIOS storage device of a second security module of the plurality of security modules, and wherein the second security module is not authenticable by the processing system based on the processing system type of the processing system.

10. The IHS of claim 8, wherein the processing system is configured to:
determine, during a booting process, the processing system type of the processing system;
locate the first entry in the image table based on the processing system type; and
authenticate the first security module identified by the first entry based on the processing system type of the processing system and, in response, cause the first security module to execute.

11. The IHS of claim 8, wherein the BIOS update engine is further configured to:
determine the processing system type of the processing system, wherein the providing the first entry in the image table with the first location of the first security module includes:
determining that the first entry in the image table identifies a second location of a second security module of the plurality of security modules, wherein the second security module is not authenticable by the processing system based on the processing system type of the processing system; and updating, in response to determining that the first entry in the image table identifies the second location of the second security module, the first entry in the image table to identify the first location of the first security module that is authenticable by the processing system based on the processing system type of the processing system.

12. The IHS of claim 8, wherein the BIOS update engine is further configured to:

determine the processing system type of the processing system, wherein the providing the first entry in the image table with the first location of the first security module includes:

invalidating a second entry in the image table that identifies a second location of a second security module of the plurality of security modules, wherein the second security module is not authenticable by the processing system based on the processing system type of the processing system.

13. The IHS of claim 12, wherein the processing system is configured to:

bypass, during a booting process, the invalidated second entry in the image table; and authenticate the first security module identified by the first entry based on the processing system type of the processing system and, in response, cause the first security module to execute.

14. The IHS of claim 13, wherein each of the processing system types includes security information specific to that processing system type and each security module is authenticable based on the security information.

15. A method for authenticating a security module, comprising:

storing, by a Basic Input/Output System (BIOS) update engine, a plurality of security modules when providing a BIOS in a BIOS storage device, wherein each of the plurality of security modules corresponds to a different processing system type, and wherein the BIOS is configured to utilize any of the plurality of security modules to perform a secure boot; and configuring, by the BIOS update engine, a first entry in an image table provided by the BIOS with a first location in the BIOS storage device of a first security module, wherein the first security module is authenticable by a processing system based on the processing system type of the processing system.

16. The method of claim 15, further comprising:

configuring, by the BIOS update engine, a second entry in the image table that identifies a second location in the BIOS storage device of a second security module of the plurality of security modules, and wherein the second security module is not authenticable by the processing system based on the processing system type of the processing system.

17. The method of claim 15, further comprising:

determining, during a booting process by the processing system, the processing system type of the processing system;

locating, by the processing system, the first entry in the image table based on the processing system type; and authenticating, by the processing system, the first security module identified by the first entry based on the processing system type of the processing system and, in response, cause the first security module to execute.

18. The method of claim 15, further comprising:

determining, by the BIOS update engine, the processing system type of the processing system, wherein the configuring the first entry in the image table with the first location of the first security module includes:

determining that the first entry in the image table identifies a second location of a second security module of the plurality of security modules, wherein the second security module is not authenticable by the processing system based on the processing system type of the processing system; and updating, in response to determining that the first entry in the image table identifies the second location of the second security module, the first entry in the image table to identify the first location of the first security module that is authenticable by the processing system based on the processing system type of the processing system.

19. The method of claim 15, further comprising:

determining, by the BIOS update engine, the processing system type of the processing system, wherein the providing the first entry in the image table with the first location of the first security module includes:

invalidating a second entry in the image table that identifies a second location of a second security module of the plurality of security modules, wherein the second security module is not authenticable by the processing system based on the processing system type of the processing system.

20. The method of claim 19, further comprising:

bypassing, by the processing system during a booting process, the invalidated second entry in the image table; and authenticating, by the processing system, the first security module identified by the first entry based on the processing system type of the processing system and, in response, cause the first security module to execute.

* * * * *